United States Patent
Dauth et al.

(10) Patent No.: US 10,838,669 B2
(45) Date of Patent: Nov. 17, 2020

(54) PRINTING METHOD WITH INCLUDES SELECTION OF PRINT PARAMETERS

(71) Applicants: SIEGWERK DRUCKFARBEN AG & CO. KGAA, Siegburg (DE); ColorFit GbR, Linz am Rhein (DE)

(72) Inventors: Frank Dauth, Lohmar (DE); Rolf-Michael Steitz, Niederkassel (DE); Markus Unkel, Linz am Rhein (DE)

(73) Assignee: SIEGWERK DRUCKFARBEN AG & CO. KGAA, Siegburg (DE)

(*) Notice: Subject to any disclaimer, the term of this patent is extended or adjusted under 35 U.S.C. 154(b) by 0 days.

(21) Appl. No.: 16/468,026

(22) PCT Filed: Nov. 16, 2017

(86) PCT No.: PCT/EP2017/079443
§ 371 (c)(1),
(2) Date: Jun. 10, 2019

(87) PCT Pub. No.: WO2018/108434
PCT Pub. Date: Jun. 21, 2018

(65) Prior Publication Data
US 2020/0012462 A1    Jan. 9, 2020

(30) Foreign Application Priority Data
Dec. 14, 2016 (EP) .................................. 16203963

(51) Int. Cl.
*G06F 3/12* (2006.01)
(52) U.S. Cl.
CPC .......... *G06F 3/1208* (2013.01); *G06F 3/1254* (2013.01); *G06F 3/1256* (2013.01)

(58) Field of Classification Search
CPC .... G06F 3/1208; G06F 3/1256; G06F 3/1254; G06F 3/1285
See application file for complete search history.

(56) References Cited

U.S. PATENT DOCUMENTS

2014/0268216 A1* 9/2014 Soriano ................ G06F 3/1285
358/1.15
2015/0278660 A1* 10/2015 Yamamoto ............ G06F 3/1285
358/1.2

FOREIGN PATENT DOCUMENTS

DE     10 2007 032 944 B4     1/2009
WO        2010/024944 A1      3/2010

OTHER PUBLICATIONS

European Search Report Corresponding to 16203963.0 dated Jun. 8, 2017.

(Continued)

*Primary Examiner* — Juan M Guillermety
(74) *Attorney, Agent, or Firm* — Davis & Bujold PLLC; Michael J. Bujold

(57) ABSTRACT

A printing method comprising the steps of providing, in relation to data of a print job to be carried out, at least one prediction for print data for at least one selection of print parameters using at least one set of sample print data (S107). At least one print parameter is optionally adjusted to provide a prediction which comes sufficiently close to the data of the print job (B109). A software product for performing the method is also disclosed, and the use of the software product for determining printing parameters for a printing method.

16 Claims, 5 Drawing Sheets

(56) References Cited

OTHER PUBLICATIONS

International Search Report Corresponding to PCT/EP2017/079443 dated Feb. 1, 2018.
Written Opinion Corresponding to PCT/EP2017/079443 dated Feb. 1, 2018.

* cited by examiner

PRINTING METHOD WITH INCLUDES SELECTION OF PRINT PARAMETERS

This application is a National Stage completion of PCT/EP2017/079443 filed Nov. 16, 2017, which claims priority from European patent application serial no. 16203963.0 filed Dec. 14, 2016.

FIELD OF THE INVENTION

The present invention is related to a printing method which provides savings in printing time and costs.

BACKGROUND OF THE INVENTION

Printers are faced with the challenge of making or reproducing a print which should correspond to the wishes of a customer to the extent possible. In order to meet this challenge, a printer has to consider several parameters which have an influence on the final print, such as the colorant formula to be used in the ink, the substrate to which the print should be applied, the printing equipment to be employed, or environmental conditions. Also, reproducibility and stability of the print have to be ensured.

In recent years, software programs have been developed in order to assist the involved persons with this task. For example, the software PantoneLIVE™ is a software that provides support in developing a colorant formula in comparison to a reference color.

In DE-10 2007 032 944 B4, a method for determining parameters of a printing process for producing standardized prints has been described. This method has been implemented in the software ColorCert®, which has now been combined with PantoneLIVE™.

According to said method, a profile is formed from a selected printing ink, from a desired spot color (i.e. the color which should be visible on the final print), and from a selected substrate on which the print should be applied. The software ColorCert® generates, based on that specific profile, possible target parameters for the printing process. In said printing process, a scorecard is generated by trial and error. First, printing according to the selected target parameters is conducted. Subsequently, the result of the printing process is analysed by a detection device. An operator then has to manually correct the printing parameters and/or the ink formula, until the printing result (as verified by further test prints) meets the required criteria.

There are disadvantages involved with said method. There is a need to establish a separate profile for each combination of ink, spot color, and substrate. Subsequently, it has to be verified by trial and error whether with this profile a print can be made which lies in predetermined tolerance ranges. Optimisation has to be made manually. The entire process is time-consuming and costly, since it requires one or more test printing steps.

SUMMARY OF THE INVENTION

It was the problem of the present invention to provide a printing method which overcomes the above drawbacks from the prior art, in particular to provide a printing method by means of which satisfactory print results can be obtained in a timely and cost-efficient manner.

The above problem was solved by the method according to the independent claim(s).

In detail, the present invention refers to a printing method, comprising the following steps providing in relation to data of a print job to be carried out at least one prediction for print data for at least one selection of print parameters using at least one set of sample print data, optionally adjusting at least one print parameter to provide a prediction which comes sufficiently close to the data of the print job.

The present invention is aiming at assisting the printer in realizing a high quality print for a given colorant formula. In other words, the colorant formula is not changed during the method of the present invention (except for a possible addition of at least one solvent for e.g. modifying the viscosity), but the printing parameters are adjusted for a given colorant formula, and for other conditions such as the kind of substrate or the printing temperature which may be predetermined by a given printing job. Also, the method and/or software product according to the present invention can be implemented into a color management system, such as the ones known in the art, in order to assist such a color management system. For example, the method and/or software product according to the present invention can be integrated into the control system of a printing machine.

With the method of the present invention, several advantages can be obtained.

There is no need for verifying and optimising the printing result by trial and error, i.e. by repeated test prints and evaluation of the quality of those test prints. With the method of the present invention, the data expected for specific printing parameters are predicted and can be compared with the data of a print job to be carried out. In case of a deviation, the method allows an adjustment of at least one printing parameter. The result of said adjustment is calculated and can be compared with the data of a print job to be carried out. It is thus possible to optimise the printing parameters without having to conduct and evaluate test prints.

Furthermore, the method may provide sample print data for a selected combination of an ink formula, a substrate and printing parameters by extrapolation of available data for a few printing configurations. In other words, for a given combination of an ink formula and a substrate, data of printing results obtained under a few specific printing conditions are provided, e.g. in a database. Based on those data, with the method of the present invention, data under different printing conditions can be extrapolated. Therewith, the need of generating experimental data for each new combination of an ink formula, a substrate and printing parameters is greatly reduced.

BRIEF DESCRIPTION OF THE DRAWINGS

In the following, the present invention will be explained with the aid of non-limiting embodiments and figures.

DETAILED DESCRIPTION OF THE PREFERRED EMBODIMENTS

Figure 1:
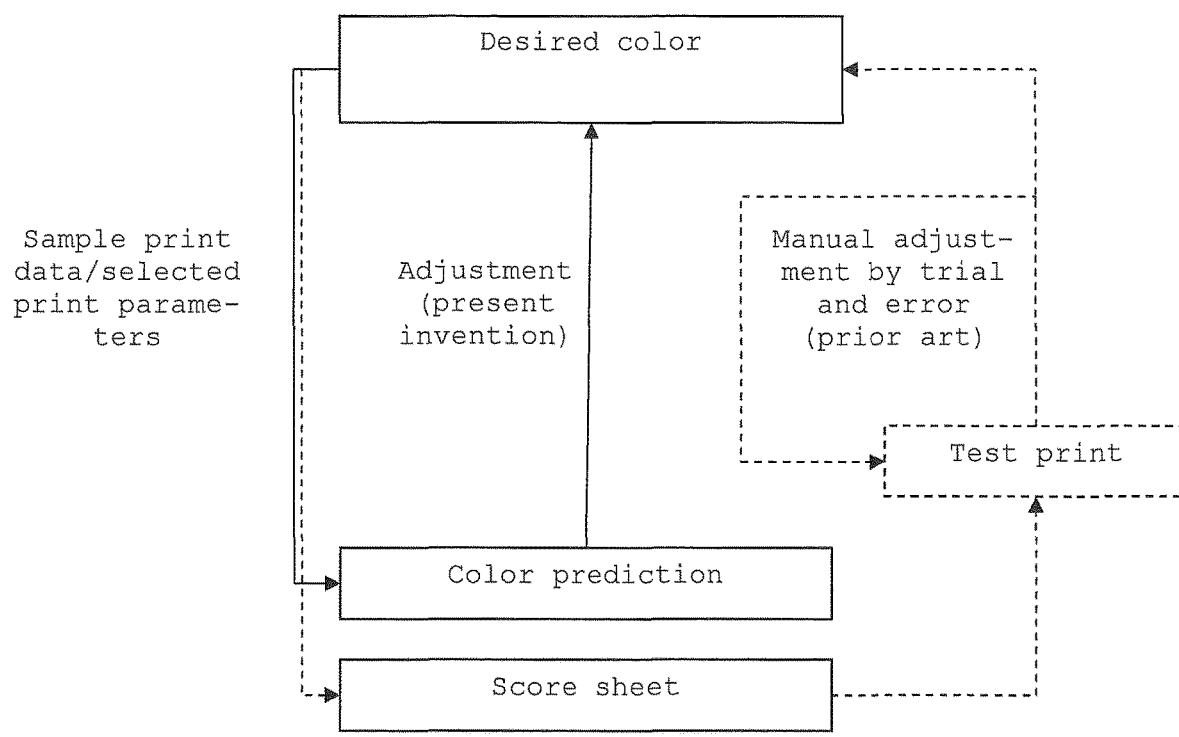
FIG. 1 shows an illustration of the principle of the present invention as compared to the prior art

The principle of the present invention is schematically outlined in FIG. 1. Data concerning at least one desired color are supplied to a printer or to the pre-press stage. According to the present invention, those data are maintained, i.e. the colorant formula is not modified according to the present invention, except for a possible addition of at least one solvent for e.g. modifying the viscosity. Eased on sample print data provided by the method of the present invention, a color prediction is provided for a set of print parameters selected by an operator.

In the method of the prior art according to e.g. DE-10 2007 032 944 B4, a test print has to be made, on the basis of a generated score sheet, and analysed for verification of the suitability of the printing parameters. This is shown in FIG. 1 by the broken lines. Based on the analysis of the test print, an operator has to adjust the printing parameters manually by trial and error until a satisfactory match with the reference color is achieved.

With the method of the present invention, as shown in FIG. 1 by the solid lines, an adjustment with the aid of a computer can be made, thus eliminating any need for a test print and analysis of a test print. With the method of the present invention, color predictions for a selected set of print parameters can be calculated and adjusted before any printing is conducted. This results in savings in costs and time.

With the method of the present invention, color predictions are provided to a printer or to the interface of a color management system, e.g. a printing machine control. Those color predictions are provided on the basis of sample print data. According to the present invention, sample print data are spectral data for a selected combination of a specific printing ink applied onto a specific substrate under specific printing conditions. Those sample print data are retrieved from a database either directly or typically by extrapolation of stored sample print data. As will be explained below in detail, in the database a few sets of sample print data are stored which have been inserted into the database in a previous step. While in rare circumstances it may be possible that one stored set of sample print data provides a satisfactory color prediction, in most of the cases it will be necessary to adjust a stored set of sample print data to the data of a print job to be carried out. Said adjustment is performed by extrapolation of the data of a stored set of sample print data, as will be discussed below in more detail.

The method of the present invention is preferably conducted with a computer. Any conventional computer system, such as a desktop computer, a work station, a laptop or any other mobile computer system may be employed.

On said computer, a software for conducting the method of the present invention is provided. Thus, the present invention is also related to a software product for performing the method described above, wherein the software product executes the following steps:

providing in relation to data of a print job to be carried out at least one prediction for print data for at least one selection of print parameters using at least one set of sample print data, optionally adjusting at least one print parameter to provide a prediction which comes sufficiently close to the data of the print job.

Said software may be either permanently installed in a memory device of said computer, such as a hard-disk. Alternatively, the software may be provided on a mobile memory system such as a CD-ROM or DVD, USB stick, SD card etc. and loaded into the working memory (PAM) of the computer. Also, the computer may be connectable with a server, preferably a web-based server such as a cloud system where the software is provided. In the latter case, the computer must be equipped with components allowing access to said server, such as via connection in a network to which the computer and the server belong, or via the internet (LAN or WLAN).

The software comprises a user-interface, preferably a graphical user interface (GUI) which allows an operator to communicate with the software. Such interfaces are well-known (e.g. available color management interfaces) and need not be discussed in detail.

Preferably, the user-interface of the software is organized hierarchically, with a main menu and several sub-menus, wherein each step to be performed with the software is linked with a respective sub-menu. An operator may switch from one sub-menu to another sub-menu, for performing steps of the present printing method.

With the user interface, an operator may insert and/or select information. For example, fields may be provided in a GUI into which text may be inserted. Alternatively, information may be selected by clicking onto certain areas of the GUI, for example onto an area of a pull-down menu, where certain information is presented. This is well-known and need not be discussed in detail.

In order to perform the printing method of the present invention, an operator has to select an ink, a substrate, a printing device, a printing method (e.g. rotogravure or flexographic printing) and optionally further process-relevant parameters. Typically, for each item to be selected a separate sub-menu is provided in the software of the present invention. It is, however, understood that this is merely an exemplary embodiment and that data input/selection may be performed by any conventional method and by any conventional user interface.

Figure 2:
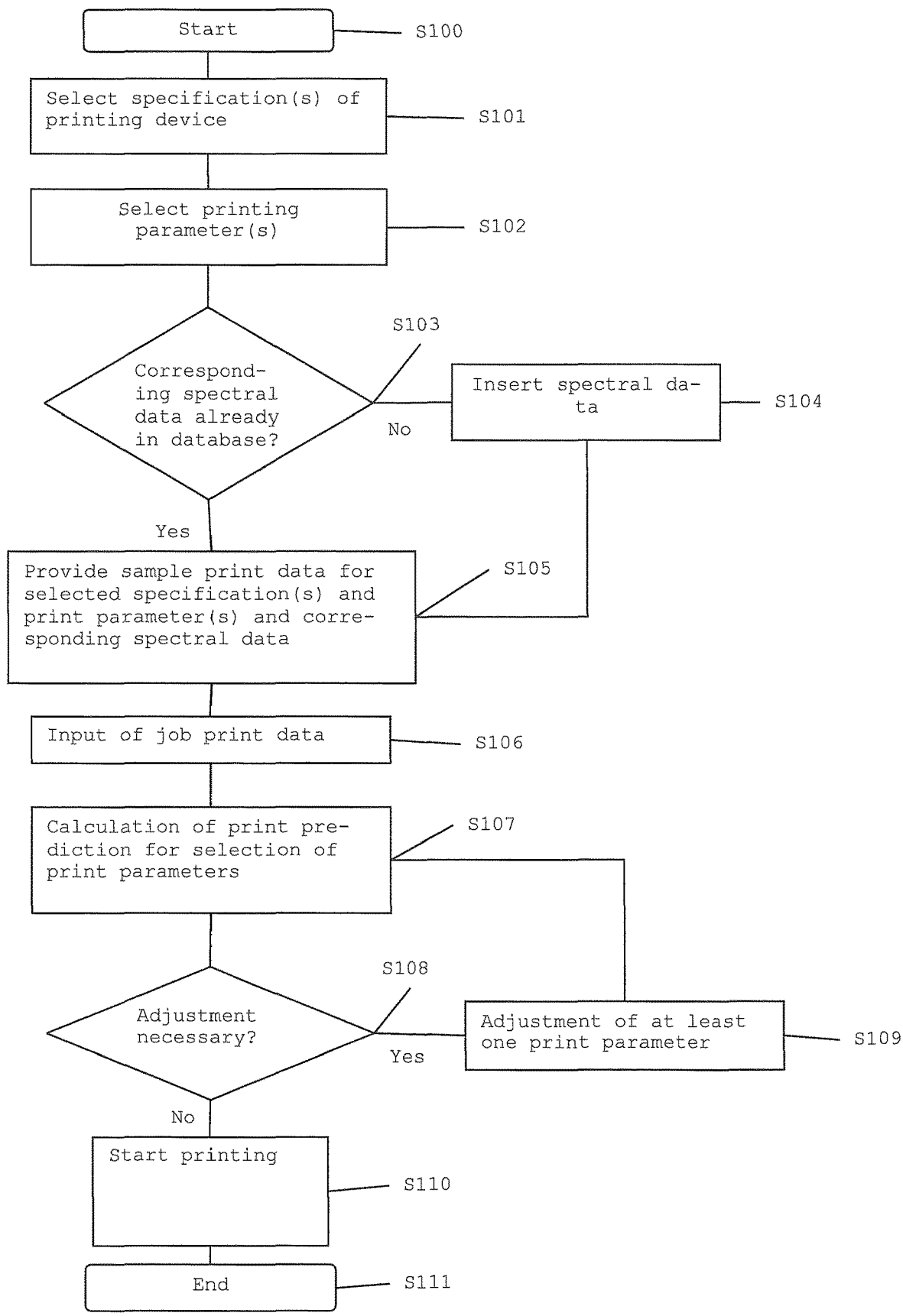
FIG. 2 shows a flow diagram of an embodiment of the method of the present invention

A non-limiting preferred embodiment of a flow diagram of the method of the present invention is shown in FIG. 2.

In the first part of the flow diagram (steps S100 to S104), sample print data are provided. Those sample print data form the basis of the subsequent calculation of a color prediction.

In a first step S101, for example in a first sub-menu, the operator may insert, or select from presented choices, one or more specifications concerning a printing device. As an example, information concerning the model of the printing device, the manufacturer of the printing device, its maximum speed, its equipment (e.g. doctor blade adjustment, viscometer, register control, etc.) may be inserted and/or selected from presented choices. The inserted/selected information is stored for further use.

In a second step S102, for example in a second sub-menu, the operator may insert, or select from presented choices, one or more printing parameters such as the substrate to which the print should be applied, the printing process to be used, the printing ink/colorant which should be used in the printing process, the cylinder specification of the selected printing device (such as anilox screen or doctor blade parameters), a suitable viscosity range of the selected printing ink which can be used with said selected printing device, the kind and/or amount of at least one solvent in the ink formula, a range of printing speeds which cars or should be used for said selected printing device, a suitable temperature range for the selected printing process temperature, and tonal values to be printed. Optionally, further or other parameters may be inserted/selected. From the above exemplary list of parameters, one, several or all parameters may be inserted/selected for performing the printing method of the present invention. The inserted/selected information is stored for further use.

The method of the present invention is not limited to the input of any specific combination of information in steps S101 and S102.

In a third step S103, it is evaluated whether in a database there are already suitable spectral data for the selections made in the preceding steps S101 and S102. The evaluation is performed by the software according to usual algorithms typically employed in software for such operations.

According to the present invention, suitable spectral data are spectral data which correspond to the selections made in the preceding steps S101 and S102, i.e. which match with the selections made in the preceding steps S101 and S102 or which come sufficiently close to these selections so that an extrapolation of spectral data which correspond to the selections made in the preceding steps S101 and S102 can be obtained.

According to the present invention, spectral data are physical information (such as a remission curve or its corresponding characterization in a color space, e.g. the CIELAB system, with lightness, chroma, and hue) defining a color under predetermined conditions. Spectral data are well-known to a skilled person and need not be explained in detail.

A part of the printing method of the present invention is a database where spectral data, preferably with the corresponding parameters (defining sample print data), are stored for use in the printing method of the present invention. Said database may be provided locally in a memory device of said computer, such as a hard-disk. Alternatively, the database may be provided on a mobile memory system such as a CD-ROM or DVD, USB stick, SD card etc. Also, and preferably, the database may be provided on a server, preferably a web-based server such as a cloud system, and the computer can access the content of said database, via a respective function of the software. In the latter case, the computer must be equipped with components allowing access to said server, such as via connection in a network to which the computer and the server belong, or via the internet (LAN or WLAN).

If in step S103 it can be confirmed that in the database there are already suitable spectral data, the method can proceed to step S105. If not, then in a step S104 suitable spectral data have to be inserted.

Spectral data as part of sample print data may be inserted into the software, and thus into the printing method of the present invention, in any conventionally used data format. As an example, cxf files from X-rite spectrophotometers may be mentioned. Those data formats are conventionally used and known to a skilled person.

The spectral data may be obtained from any sources, for example from other databases, spectral catalogues, or from measurements of test samples. Also, the results of the printing in step 3110 may be used in a preferred embodiment of the present invention as a source of further spectral data, so that the method of the present invention may be devised so as to improve itself.

The spectral data obtained in the preceding steps S103 or S104 are used in step 3105 of the printing method of the present invention for providing sample print data.

An example of sample print data to be used in the printing method of the present invention are spectral data defining a print prepared with a magenta colorant in a solvent-based ink with a specific binder system (e.g. on the basis of nitrocellulose), wherein said ink is printed onto a specific substrate (e.g. oriented polypropylene) under specific printing conditions (e.g. specific printing plate, specific printing speed, specific viscosity of the printing ink, specific doctor blade angle, specific printing temperature).

For the purposes of the present invention, it is sufficient that only a few sets of sample print data are provided in the database, since with the method of the present invention it is possible to extrapolate therefrom spectral data for other printing parameters. In other words, the software to be used in the method of the present invention is capable of calculating, on the basis of sample print data provided in the database, other spectral data for different printing parameters. For example, the method of the present invention may contain experimentally generated sample print data for a print prepared with a magenta colorant in a solvent-based ink with a specific binder system (e.g. on the basis of nitrocellulose), wherein said ink is printed onto a specific substrate (e.g. oriented polypropylene) under a set of specific printing conditions, e.g. printing on a specific printing press at 25° C., a humidity of 50%, a printing speed of 250 m/min and a viscosity of the ink of 26 s (as measured with a Ford Cup (ASTM D1200)). The method of the present invention is now capable to extrapolate therefrom sample print data for the same colorant, ink and substrate under a set of different printing conditions, e.g. on a specific printing press at 25° C., a humidity of 50%, a printing speed of 300 m/min and a viscosity of the ink of 30 s (as measured with a Ford Cup (ASTM D1200)).

Said extrapolation is conducted on the basis of known data science techniques (e.g. regression analysis), mapping to the image of remission curves from the n-dimensional inverse image of parameters influencing the color on a substrate during the printing process. These parameters may be scalable parameters such as e.g. the printing speed or the viscosity, or non-scalable parameters such as e.g. the substrate or the ink composition. A non-scalable parameter has to be numerically characterized by a set of scalable parameters using dimensionality reduction, or by combining all known scalable parameters characterizing this non-scalable parameter with respect to the printing process. The characterization of the non-scalable parameters and the advanced evaluation of the mentioned mapping can be performed with the aid of printing experiments, computational simulations and physical assumptions of interactions between various parameters, e.g. the ink-substrate interaction. In conclusion, the extrapolation consists of various data science and machine learning techniques such as e.g. polynomial regression, clustering and dimensionality reduction to handle with the complex behaviour between the amounts of parameters influencing each other and the remission curve of the color on a substrate.

This is an advantage of the printing method of the present invention, since it reduces the amounts of measurements which have to be performed for gathering the required sample print data. Thus, time and cost savings are achieved also at this stage.

With the above described steps, sample print data are provided which form the basis of the printing method of the present invention.

According to a preferred embodiment of the present invention, the data contained in the database can be visualized on a screen of a monitor.

The actual adjustment process of the present invention starts in step 3106 by introducing data of a print job to be carried out. Those data will usually be received from a customer, but may of course also be obtained from any other source. Those data are typically spectral data and typically comprise information on tonal values, the substrate on which the print should be applied, and tolerances for the spectral data. With those data, a spectral curve (e.g. in a CIELAB coordinate system) can be generated.

Preferably, the software is capable of displaying said spectral data, most preferably in the form of a spectral curve in a coordinate system, such as a CIELAB coordinate system.

In a next step S107, the software now provides at least one prediction for print data for at least one selection of print parameters.

In other words, the software selects a set of sample print data from the database which comes sufficiently close to the data of the print job to be carried out. The evaluation whether a set of sample print data exists in the database which comes sufficiently close to the data of the print job to be carried out, is carried out by the software. For that purpose, tolerance ranges are provided which define to which extent a prediction may deviate from the data of the print job to be carried out. According to a preferred embodiment of the present invention, a prediction for print data is evaluated as sufficiently close to the data of the print job to be carried out if corresponding points of these spectral curves, e.g. tonal value curves (according to the present invention a tonal value curve is the sum of single spectral curves in each tonal value, expressed in L, a and b values), of the prediction and the print job data deviate from each other not more than a specified input data of tolerances, e.g. dE2000<2.0 and/or density<0.05. dE (also called delta E) is a number indicating the difference between two colors. dE2000 is the color difference as determined according to the respective equation from the revision of the CIE dE94 equation in the year 2000. A tolerance level dE2000<2.0 means that any two points which according to the dE2000 equation have a color difference of 2.0 or more are not deemed as being sufficiently close, for the purposes of the present invention.

A tolerance level of (color) density of less than 0.05 means that any two points which have a difference in color density (as determined by common methods of analyzing color density) of 0.05 or more are not deemed as being sufficiently close, for the purposes of the present invention.

Other tolerance levels based on commonly known color parameters may be used as well, according to the present invention.

According to the present invention, one or a combination of two or more of such tolerance levels may be used.

Corresponding points here mean points of the tonal value curves of the prediction and the print job data having one same value selected from the list of L, a or b values in a CIELAB coordinate system, but which may show at least one deviations with respect to any of their other values from the above list.

If there is no already existing set of sample print data in the database which has been provided with the printing parameters of the print job to be carried out, the software calculates a respective prediction by extrapolation from an existing set of sample print data, as described above.

In said step, the method calculates under which printing conditions (such as e.g. print speed, viscosity of the printing ink, environmental conditions such as temperature and humidity) a color can be expected which matches with or comes sufficiently close to the data of the print job to be carried out. For that purpose, the database is searched for suitable sample print data and suitable print data are output or extrapolated from existing sample print data. As a result, the operator obtains from the method of the present invention printing conditions he should apply in order to get the desired color.

Preferably, the spectral data of the print job to be carried out and of the prediction provided by the software are output for evaluation by the operator and/or a color management interface. According to a very preferred embodiment of the present invention, both spectral data are displayed together in the form of a spectral curve in a coordinate system, such as a CIELAB coordinate system.

The operator can now evaluate the quality of the prediction provided by the software and decide whether a further adjustment is necessary, in step S108.

If no adjustment is necessary, i.e. if the calculated prediction is already sufficiently similar to the data of a print job to be carried out (as assessed by the operator), in step S110 printing can be started with the determined printing parameters, and the method of the present invention ends.

If, on the other hand, an adjustment is necessary, such adjustment can be performed by the operator in communication with the software of the present invention. In Step 3109, an operator can insert at least one adjusted print parameter, and the program calculates a new prediction on the basis of the adjusted print parameter.

According to a preferred embodiment of the present invention, for the purpose of performing step S109 input means may be provided on a GUI, such as bars which can be modified by a mouse click or by pulling the bar with a mouse cursor. According to an especially preferred embodiment of the present invention, the result of said input can be instantaneously visualized for evaluation by the operator. In that way, an easy, quick and efficient adjustment of at least one printing parameter can be performed.

Printing parameters to be adjusted in step S109 are any printing parameters which have an influence on the printing result. According to a preferred embodiment of the present invention, said at least one printing parameter is selected from the group consisting of viscosity of the ink formula, printing speed and other parameters with respect to costs, efficiency, repeatability and feasibility. For example, the printing speed or the viscosity of the printing ink may be modified. According to the present invention, in step S109 one or more printing parameters can be adjusted. The adjustment can be performed as often as necessary until the desired color result is achieved.

An adjustment may also be necessary, for example, if the suggested printing conditions cannot be realized with the printing equipment the operator has at its disposal.

After adjustment, the program returns to step S108. If the operator now assesses that no further adjustment is required, as described above in step S110 printing can be started, and the method of the present invention ends.

Thus, according to an especially preferred embodiment of the present invention, there is provided a printing method, comprising the following steps selection of at least one specification of a printing device (3101), preferably by insertion of information into a software, preferably a sub-menu thereof, or by selection of information in a software, preferably a sub-menu thereof, selection of at least one printing parameter (S102), preferably by insertion of information into the software, preferably a sub-menu thereof, or by selection of information in a software, preferably a sub-menu thereof, optionally, insertion of spectral data corresponding to the selections made in S101 and 3102 into the software (S104), preferably a sub-menu thereof, providing sample print data corresponding to the selections made in S101 and S102 and to related spectral data optionally provided in S104, insertion of data of a print job to be carried out (S106) into the software, preferably a sub-menu thereof, providing in relation to the data of the print job to be carried out, at least one prediction for print data for at least one selection of print parameters using at least one set of sample print data (S107), optionally adjusting at least one print parameter to achieve match of the prediction with the data of the print job (S109)

printing after a prediction has been provided which comes sufficiently close to the data of the print job to be carried out.

Figure 3:
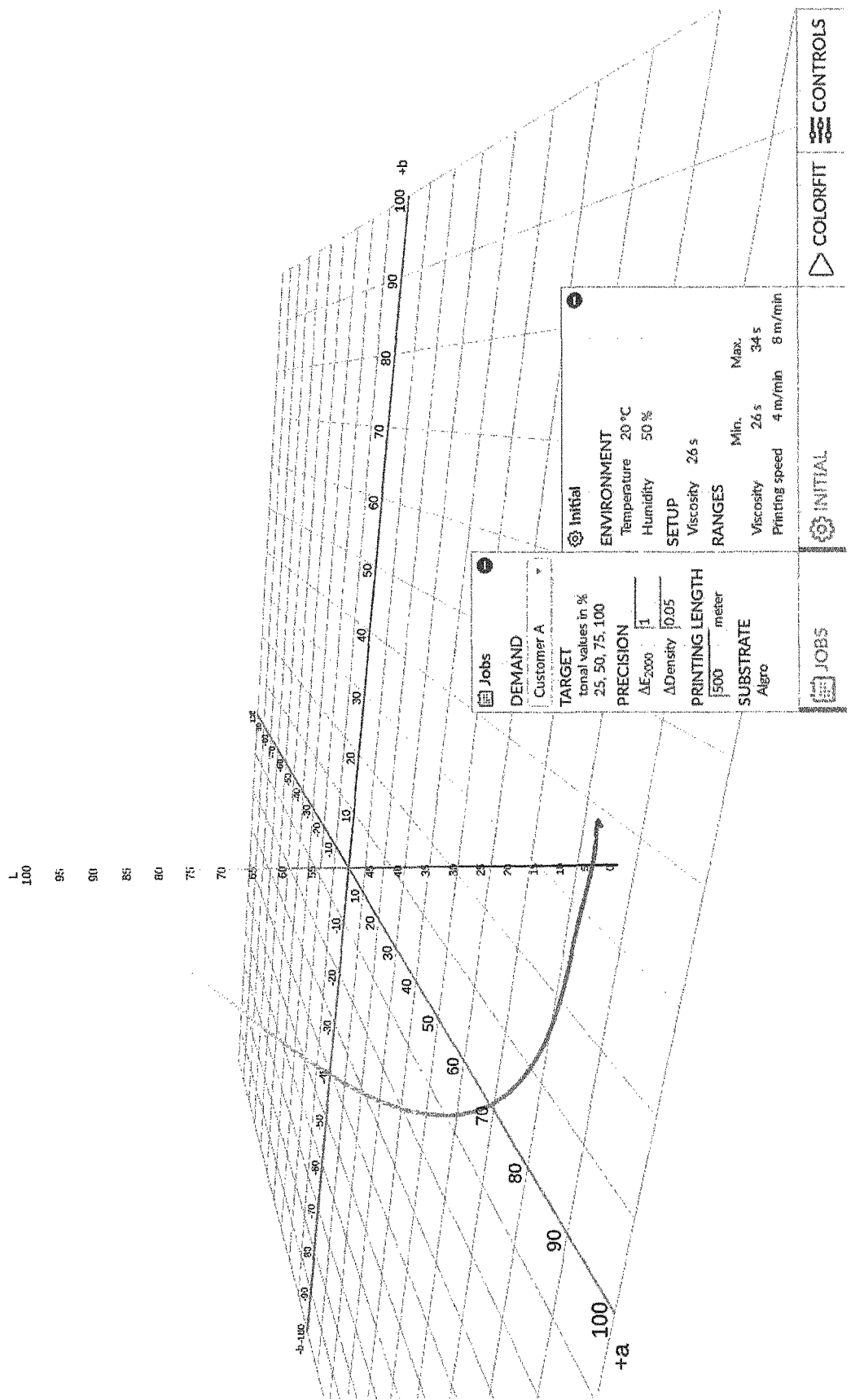
FIG. 3 shows an embodiment of a visualization of data of a print job to be carried out
Figure 4:
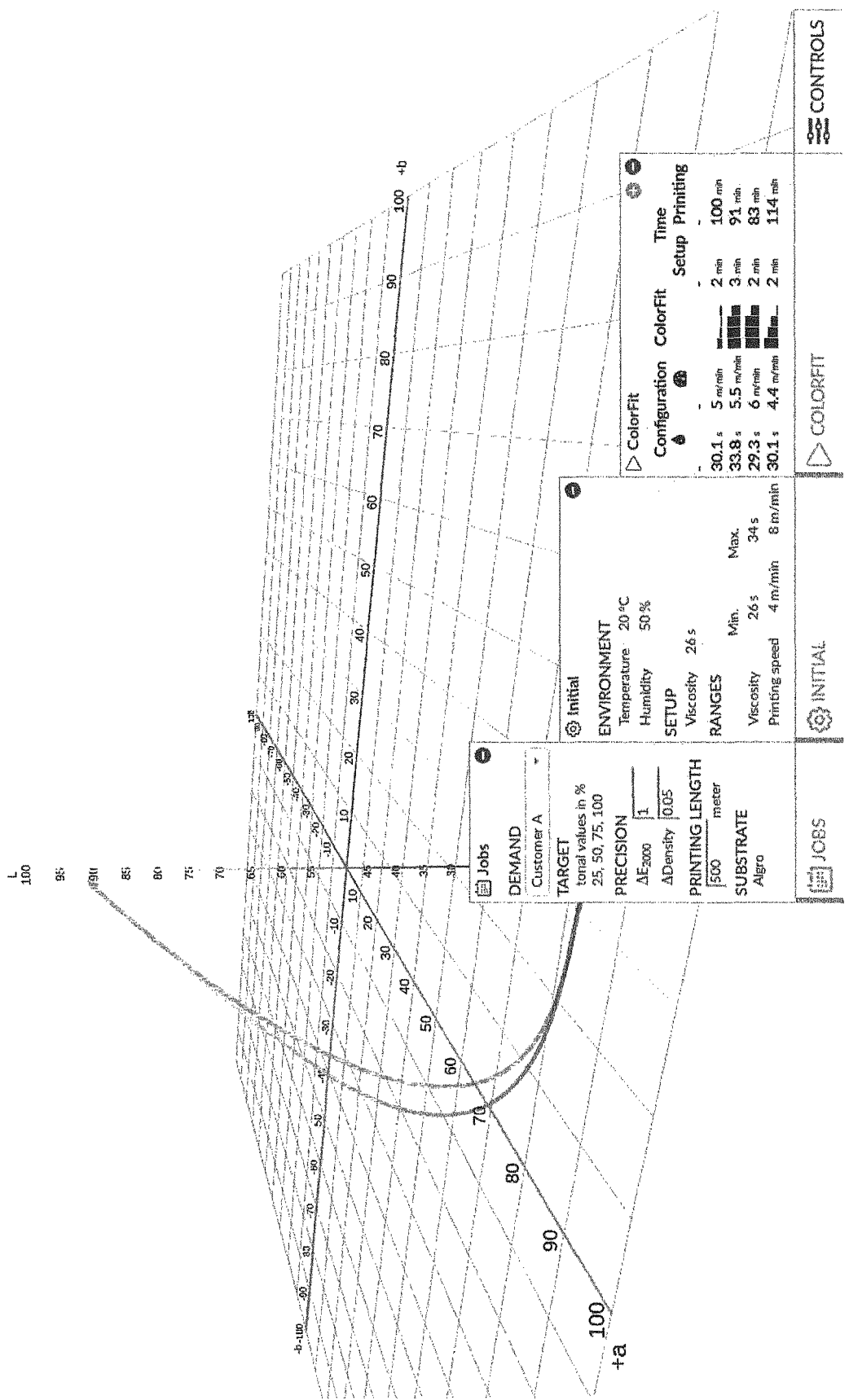
FIG. 4 shows an embodiment of a visualization of data of a print job to be carried out along with data showing a prediction under specific printing parameters
Figure 5:
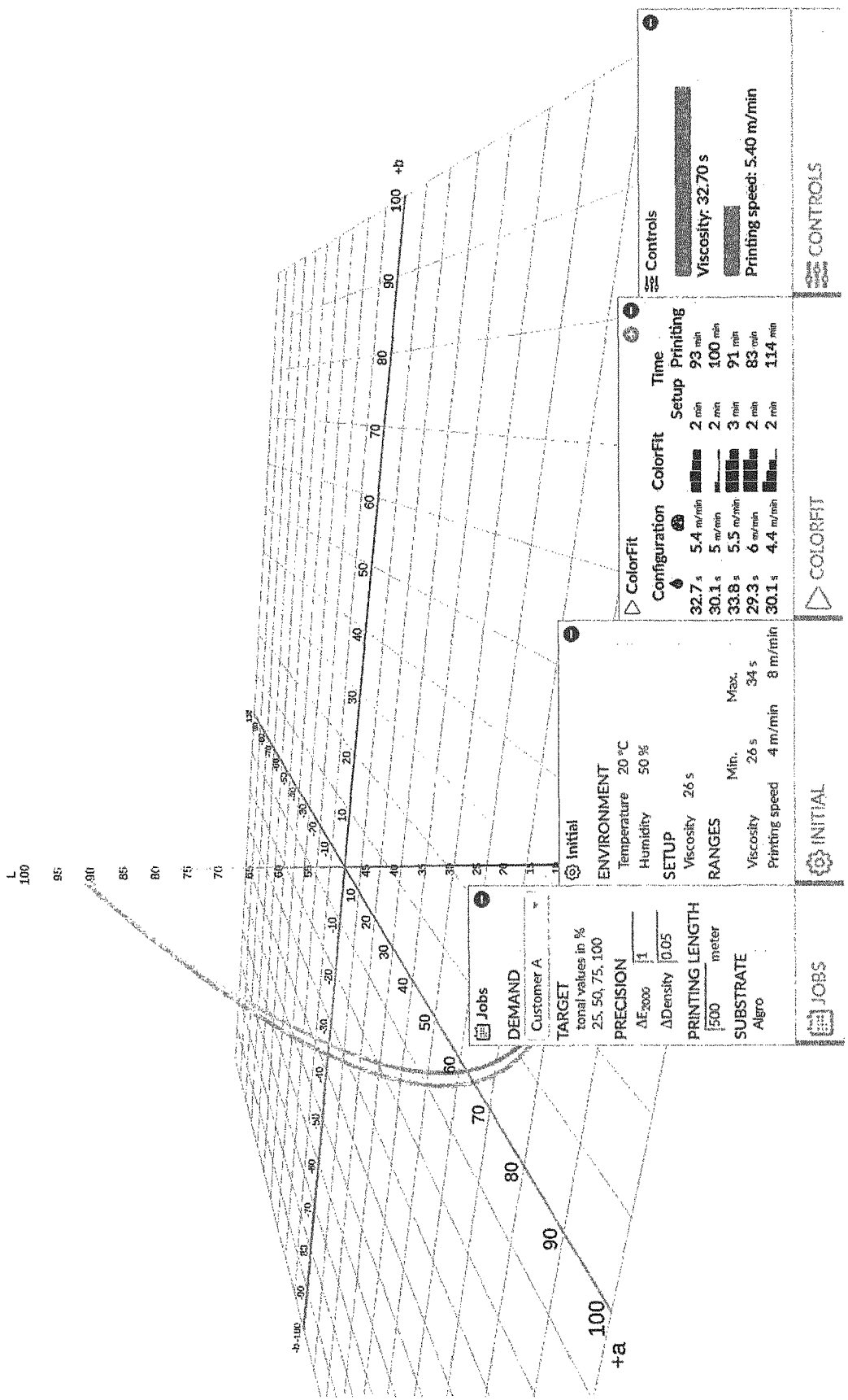
FIG. 5 shows an embodiment of a visualization of data of a print job to be carried out along with data showing a prediction under specific printing parameters, after adjustment of the printing parameters.

An example of determining printing parameters with the method of the present invention is illustrated in FIGS. 3 to 5.

In FIG. 3, data of a print job to be carried out are visualized by the method of the present invention. Those data are provided, for example, by a customer who wishes to have the print job carried out by the printer, by measuring a sample (color reference), or by the above described method steps which precede the printing. The spectral data defining the print job to be carried out are indicated in e.g. a CIELAB coordinate system as a curve.

According to a preferred embodiment of the present invention, it is possible to also output the data of a print job to be carried out in other form, e.g. numerical form. In FIG. 3, this is shown, for example, by one or more pull-down menus which can be opened and closed in a GUI. In the embodiment of FIG. 3, there are two pull-down menus, wherein in one pull-down menus information concerning the colorant, the substrate and the printing speed are provided, and in a second pull-down menu initial printing parameters are indicated under which the data of the print job to be carried out were generated.

In FIG. 4, along with the data of the print job to be carried out (red curve), data representing a prediction according to the method of the present invention (green curve) are visualized. In the embodiment of FIG. 4, it can be seen that the prediction provided by the method of the present invention deviates to a slight extent from the curve representing the data of the print job to be carried out.

According to a preferred embodiment of the present invention, it is possible to also output the data of the prediction in other form, e.g. numerical form. In FIG. 4, this is shown, for example, by one pull-down menu which can be opened and closed in a GUI. In the embodiment of FIG. 4, in said pull-down menu information concerning the best prediction are provided along with information concerning other, less suitable predictions. According to this preferred embodiment, the operator thus gets information on trends for deviation which may assist him in adjusting the print parameters for obtaining an optimal result.

In FIG. 5, along with the data of the print job to be carried out (red curve), data representing a prediction according to the method of the present invention (green curve) are visualized after adjustment of at least one printing parameter. In the embodiment of FIG. 5, it can be seen that due to the adjustment of one or more printing parameters an essentially complete match of the spectral curves for the print job and the prediction has been achieved. The printer can thus expect that with the adjusted printing parameters he can achieve a satisfactory printing result. No trial and error analysis of test prints is necessary.

According to a preferred embodiment of the present invention, it is possible to adjust one or more printing parameters in a quick, easy and efficient manner by input tools provided on a GUI. In the embodiment of FIG. 5, a pull-down menu can be opened and closed. In said pull-down menus, bars for the viscosity of the printing ink and the printing speed are provided. By simply pulling the respective bar with a mouse cursor, for example, the respective printing parameter can be modified.

According to a preferred embodiment of the present invention, the modifications of the printing parameters are further visualized in a pull-down menu. As compared to FIG. 4, it can be seen that in the middle pull-down menu the values of the printing parameters were changed due to the adjustment carried out by pulling the bars in the right pull-down menu. Of course, any other element of a GUI (e.g. spin control, pressure control) could be used for this purpose.

The method of the present invention provides a useful tool for a printer to carry out a print job. Thus, in a further aspect the present invention is related to the use of a software product as described above for determining printing parameters for a printing method.

The invention claimed is:

1. A printing method comprising the following steps:
   a) providing, in relation to data of a print job to be carried out, said data being spectral data comprising at least information on tonal values of an ink formula, a substrate on which the printing method is to be applied and tolerances for the spectral data, at least one prediction for print data for at least one selection of print parameters using at least one set of sample print data, wherein said at least one set of sample print data comprises the spectral data for a preselected ink formula, a preselected substrate, and preselected print parameters, and
   b) optionally adjusting at least one print parameter to provide a prediction which comes sufficiently close to the data of the print job,
   wherein in step a) and/or b) said prediction for the print data is provided which comes sufficiently close to the data of the print job to be carried out such that corresponding points of the spectral curves, in a CIELAB coordinate system, of the prediction and the print job data deviate from each other not more than a specified tolerance.

2. The printing method according to claim 1, wherein printing is only started after said prediction is provided which comes sufficiently close to the data of the print job.

3. The printing method according to claim 2, wherein steps a) and/or b) are carried out with aid of a computer.

4. The printing method according to claim 1, wherein steps a) and/or b) are carried out with aid of a computer.

5. The printing method according to claim 1, wherein said at least one set of sample print data are stored in a database and can be retrieved from said database.

6. The printing method according to claim 5, wherein said stored sample print data can be visualized.

7. The printing method according to claim 1, wherein in step a) said prediction is provided by extrapolation from a set of sample print data stored in a database.

8. The printing method according to claim 1, wherein the print parameter to be adjusted in step b) is selected from the group consisting of viscosity of the preselected ink formula, a kind and/or an amount of at least one solvent in the preselected ink formula, machine parameters such as anilox screen or doctor blade parameters, printing speed, costs, efficiency, repeatability and feasibility.

9. The printing method according to claim 1, wherein the data of the print job, the prediction for print data and said adjusted prediction for print data are visualized as a function of the print parameters.

10. The printing method according to claim 1 wherein the specified input data of tolerances are approximately dE2000<2.0 and/or density<0.05.

11. A software product for performing the method according to claim 1, wherein the software product executes the a) the providing and b) the adjusting steps.

12. The software product according to claim 11, wherein the product comprises a database for storing sample print data.

13. The software product according to claim 11, wherein the product comprises an interface allowing to insert, or select from presented choices, information concerning the sample print data.

14. The software product according to claim 11, wherein the product comprise a means for visualization of data.

15. A printing method comprising the following:
providing, in relation to data of a print job to be carried out, said data being spectral data comprising at least information on tonal values of an ink formula, a substrate on which the printing method is to be applied and tolerances for the spectral data, at least one prediction for print data for at least one selection of print parameters using at least one set of sample print data, wherein said at least one set of sample print data comprises the spectral data for a preselected ink formula, a preselected substrate, and preselected print parameters, and wherein in step a) and/or b) said prediction for the print data is provided which comes sufficiently close to the data of the print job to be carried out such that corresponding points of the spectral curves, in a CIELAB coordinate system, of the prediction and the print job data deviate from each other not more than a specified tolerance.

16. A printing method comprising the following steps:
a) providing, in relation to data of a print job to be carried out, said data being spectral data comprising at least information on tonal values of an ink formula, a substrate on which the printing method is to be applied and tolerances for the spectral data, at least one prediction for print data for at least one selection of print parameters using at least one set of sample print data, wherein said at least one set of sample print data comprises the spectral data for a preselected ink formula, a preselected substrate, and preselected print parameters, and
b) adjusting at least one print parameter to provide a prediction which comes sufficiently close to the data of the print job, wherein in step a) and/or b) the prediction for the print data is provided which comes sufficiently close to the data of the print job to be carried out such that corresponding points of the spectral curves, in a CIELAB coordinate system, of the prediction and the print job data deviate from each other not more than a specified tolerance.

* * * * *

UNITED STATES PATENT AND TRADEMARK OFFICE
CERTIFICATE OF CORRECTION

| | |
|---|---|
| PATENT NO. | : 10,838,669 B2 |
| APPLICATION NO. | : 16/468026 |
| DATED | : November 17, 2020 |
| INVENTOR(S) | : Frank Dauth, Rolf-Michael Steiz and Markus Unkel |

Page 1 of 1

It is certified that error appears in the above-identified patent and that said Letters Patent is hereby corrected as shown below:

On the Title Page

Item (54), and in the Specification in the title of the invention, replace the word "WITH" with --WHICH--.

Signed and Sealed this
Twelfth Day of January, 2021

Andrei Iancu
*Director of the United States Patent and Trademark Office*